(12) United States Patent
Tetsuka et al.

(10) Patent No.: US 10,505,588 B2
(45) Date of Patent: Dec. 10, 2019

(54) BICYCLE COMPONENT WITH WIRELESS COMMUNICATION

(71) Applicant: Shimano Inc., Sakai, Osaka (JP)

(72) Inventors: Toshio Tetsuka, Osaka (JP); Tsuyoshi Miyake, Osaka (JP)

(73) Assignee: Shimano Inc., Osaka (JP)

( * ) Notice: Subject to any disclaimer, the term of this patent is extended or adjusted under 35 U.S.C. 154(b) by 1362 days.

(21) Appl. No.: 14/260,902

(22) Filed: Apr. 24, 2014

(65) Prior Publication Data

US 2015/0311954 A1 Oct. 29, 2015

(51) Int. Cl.
*H04B 5/00* (2006.01)
*H02J 50/10* (2016.01)
*H02J 7/02* (2016.01)

(52) U.S. Cl.
CPC ............ *H04B 5/0037* (2013.01); *H02J 7/025* (2013.01); *H02J 50/10* (2016.02)

(58) Field of Classification Search
CPC .......... H02J 5/005; H02J 7/025; H04B 5/0037
USPC ........................................................ 307/104
See application file for complete search history.

(56) References Cited

U.S. PATENT DOCUMENTS

| | | | |
|---|---|---|---|
| 5,027,303 A | 6/1991 | Witte | |
| 6,150,794 A * | 11/2000 | Yamada | B60L 11/007 320/107 |
| 7,585,257 B2 | 9/2009 | Miyamaru et al. | |
| 7,806,006 B2 | 10/2010 | Phillips et al. | |
| 7,861,599 B2 | 1/2011 | Meggiolan | |
| 8,006,574 B2 | 8/2011 | Meyer | |
| 8,065,926 B2 | 11/2011 | Meyer | |
| 2007/0145709 A1 | 6/2007 | Matsumoto | |
| 2010/0263468 A1 | 10/2010 | Fisher et al. | |
| 2012/0210784 A1* | 8/2012 | Kokkoneva | G01D 11/24 73/431 |
| 2014/0214285 A1* | 7/2014 | Wesling | F16H 59/02 701/51 |
| 2014/0354419 A1* | 12/2014 | Frier | B60R 25/10 340/432 |

FOREIGN PATENT DOCUMENTS

| | | |
|---|---|---|
| CN | 102464080 A | 5/2012 |
| CN | 103661773 A | 3/2014 |
| GB | 2 456 821 A | 7/2009 |

(Continued)

*Primary Examiner* — Alfonso Perez Borroto
(74) *Attorney, Agent, or Firm* — Global IP Counselors, LLP

(57) ABSTRACT

A bicycle component is basically provided with a wireless electrical power transmission arrangement and a wireless communication arrangement. The wireless electrical power transmission arrangement has a power transmitter and a power receiver to wirelessly transfer electrical power from the power transmitter to the power receiver. The wireless communication arrangement has a first communication unit and a second communication unit. The first and second communication units are spaced apart to wirelessly communicate from one of the first and second communication units to the other of the first and second communication units. The wireless communication arrangement is spaced from the wireless electrical power transmission arrangement by a prescribed distance that is larger than 5.0 mm.

18 Claims, 8 Drawing Sheets

(56) References Cited

FOREIGN PATENT DOCUMENTS

| | | | |
|---|---|---|---|
| JP | 2004-322809 | A | 11/2004 |
| JP | 2009-192385 | A | 8/2009 |
| WO | 2011/030215 | A1 | 3/2011 |

\* cited by examiner

BICYCLE COMPONENT WITH WIRELESS COMMUNICATION

BACKGROUND

Field of the Invention

This invention generally relates to a bicycle component with wireless communication. More specifically, the present invention relates to a bicycle component having both wireless communication and wireless power or wireless energy transmission.

Background Information

Recently, some bicycles are provided with cycle computers for providing information (e.g., operating conditions, rider performance, etc.) to the rider. Also some bicycles are provided with electronic bicycle components for assisting the rider in operating the bicycle or for adjusting an operating condition of the bicycle to improve the comfort or performance of the bicycle. Information on various operating conditions and rider performance are often used by electronic bicycle components that are adjusted based on the bicycle operating conditions. One particularly useful piece of information is the power exerted by the rider on the bicycle components due to the pedaling force applied by the rider.

One example of a bicycle power sensing apparatus is disclosed in the U.S. Pat. No. 7,861,599. In this patent, the bicycle power sensing apparatus measures a power exerted to rotate a bicycle wheel, a crank, or other rotating part. The bicycle power sensing apparatus is basically provided with a cadence sensor, a strain gauge, an amplifier, an A/D converter, a processor and a wireless transmitter. The cadence sensor measures cadence (the rotational speed of the crank). The strain gauge measures a strain of the crank shaft occurring when a rider is pedaling. The amplifier amplifies an analog electric signal outputted from the strain gauge to a range that can be processed by the A/D converter. The A/D converter circuit converts the amplified analog electric signal to a digital signal. The processor calculates the torque acting on the crank shaft based on this digital electric signal. The processor calculates a power imparted by the rider based on this torque and the cadence outputted from the cadence sensor. The wireless transmitter transmits the power or torque calculated by the processor to a cycling computer. The display unit includes a central processing unit and memory that can display useful information to benefit the cyclist. For example, the display unit can display time, cycling trip time, trip distance, odometer readings, a stop watch display, cadence (RPMs), speed, average speed, lap counter and heart rate (with the cyclist wearing a heart rate sensor).

SUMMARY

Generally, the present disclosure is directed to various features of a bicycle component that has both wireless communication and wireless power or wireless energy transmission.

In view of the state of the known technology and in accordance with a first aspect of the present disclosure, a bicycle component is provided that basically comprises a wireless electrical power transmission arrangement and a wireless communication arrangement. The wireless electrical power transmission arrangement has a power transmitter and a power receiver to wirelessly transfer electrical power from the power transmitter to the power receiver. The wireless communication arrangement has a first communication unit and a second communication unit. The first and second communication units are spaced apart to wirelessly communicate from one of the first and second communication units to the other of the first and second communication units. The wireless communication arrangement is spaced from the wireless electrical power transmission arrangement by a prescribed distance that is larger than 5.0 mm.

In accordance with a second aspect of the present invention, the bicycle component according to the first aspect further comprises a stationary structure having the power transmitter and the first communication unit disposed thereon, and a rotating structure rotatably mounted relative to the stationary structure about a rotational axis, the rotating structure having the power receiver and the second communication unit disposed thereon.

In accordance with a third aspect of the present invention, the bicycle component according to the second aspect is configured so that the wireless communication arrangement is disposed adjacent a first axial end of the rotating structure, the wireless electrical power transmission arrangement is disposed adjacent a second axial end of the rotating structure, and the first and second axial ends are opposite ends of the rotating structure with respect to the rotational axis.

In accordance with a fourth aspect of the present invention, the bicycle component according to the second aspect is configured so that the stationary structure includes a first bottom bracket part with the power transmitter disposed thereon and a second bottom bracket part with the first communication unit disposed thereon.

In accordance with a fifth aspect of the present invention, the bicycle component according to the fourth aspect is configured so that the stationary structure includes a first coil holder that is coupled to the first bottom bracket part with the power transmitter disposed on the first coil holder, and a second coil holder that is coupled to the second bottom bracket part with the first communication unit disposed on the second coil holder.

In accordance with a sixth aspect of the present invention, the bicycle component according to the fifth aspect is configured so that the first and second coil holders are formed of a non-magnetism material.

In accordance with a seventh aspect of the present invention, the bicycle component according to the second aspect is configured so that the rotating structure includes a crank axle, a first crank arm coupled to a first end of the crank axle, and a second crank arm coupled to a second end of the crank axle.

In accordance with an eighth aspect of the present invention, the bicycle component according to the seventh aspect is configured so that at least one of the crank axle and the first and second crank arms includes at least one strain sensor connected to the second communication unit.

In accordance with a ninth aspect of the present invention, the bicycle component according to the second aspect further comprises a power measurement arrangement disposed on the rotational structure.

In accordance with a tenth aspect of the present invention, the bicycle component according to the ninth aspect further comprises a crank arm having the power measurement arrangement disposed thereon.

In accordance with an eleventh aspect of the present invention, the bicycle component according to the second aspect is configured so that the stationary structure includes a hub axle, and the rotating structure includes a hub shell.

In accordance with a twelfth aspect of the present invention, the bicycle component according to the second aspect further comprises a first seal structure disposed in an axial space between the stationary structure and the rotating structure at a location radially outward of the wireless electrical power transmission arrangement, and a second seal structure disposed in an axial space between the stationary structure and the rotating structure at a location radially outward of the wireless communication arrangement.

In accordance with a thirteenth aspect of the present invention, the bicycle component according to the first aspect is configured so that each of the first and second communication units includes an antenna coil.

In accordance with a fourteenth aspect of the present invention, the bicycle component according to the thirteenth aspect is configured so that each of the antenna coils are covered by a non-magnetism material.

In accordance with a fifteenth aspect of the present invention, the bicycle component according to the first aspect is configured so that the power transmitter includes a DC-AC converter.

In accordance with a sixteenth aspect of the present invention, the bicycle component according to the first aspect is configured on that the power transmitter includes a power line communication unit.

In accordance with a seventeenth aspect of the present invention, the bicycle component according to the first aspect further comprises a remote electrical power supply electrically connected to the power transmitter by an external power cable.

In accordance with an eighteenth aspect of the present invention, the bicycle component according to the first aspect is configured so that the power receiver includes a capacitor configured to storage electrical power received from the power transmitter.

In accordance with a nineteenth aspect of the present invention, the bicycle component according to the first aspect is configured so that the prescribed distance is larger than 10.0 mm.

Also other objects, features, aspects and advantages of the disclosed bicycle component will become apparent to those skilled in the art from the following detailed description, which, taken in conjunction with the annexed drawings, discloses one embodiment of the bicycle component.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
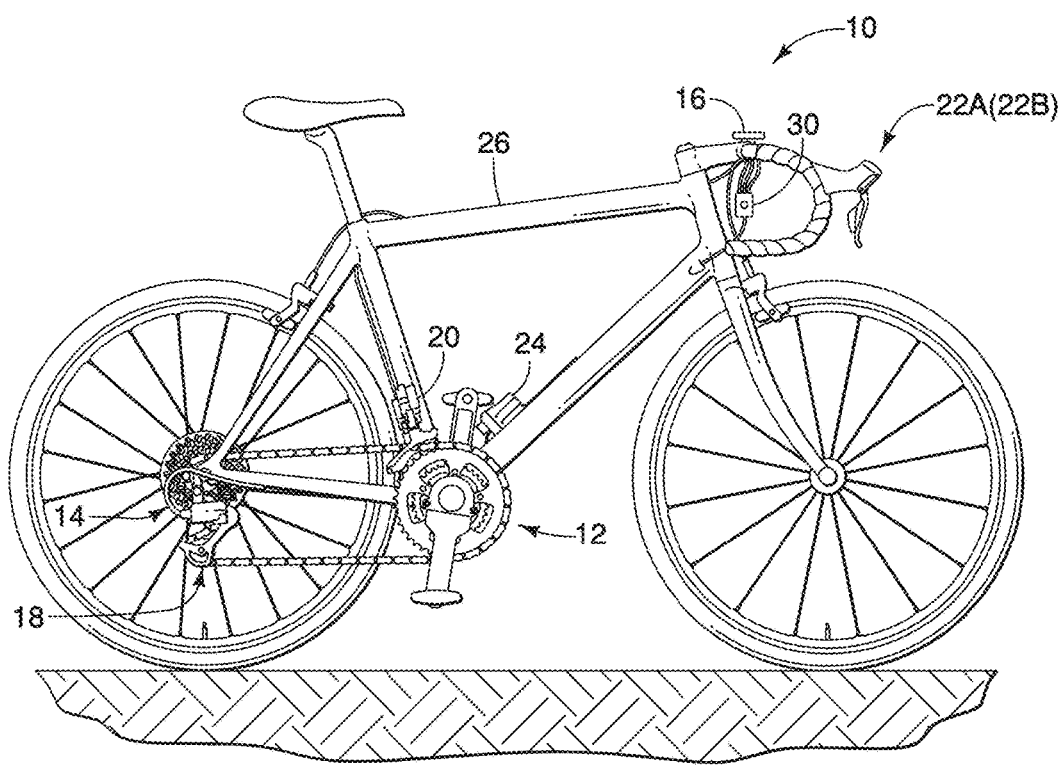
FIG. 1 is a side elevational view of a bicycle that is equipped with a pair of bicycle components, each having a wireless electrical power transmission arrangement and a wireless communication arrangement in accordance with an illustrative embodiment.
Figure 2:
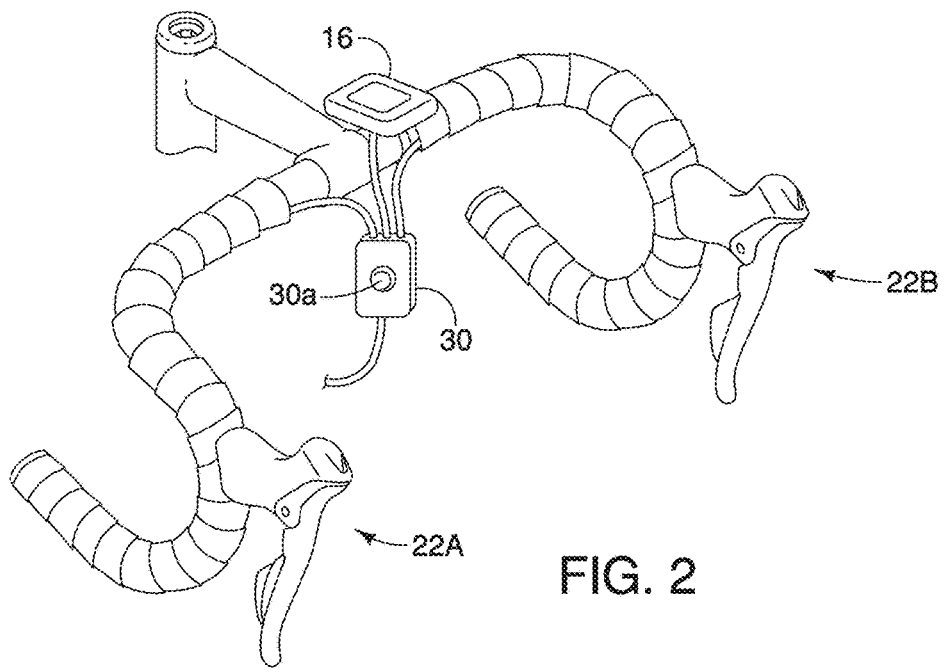
FIG. 2 is a perspective view of a handlebar area of the bicycle illustrated in FIG. 1.

Referring initially to FIG. 1, a bicycle 10 is illustrated that is equipped with an electric bicycle shifting system in accordance with a first embodiment. While the bicycle 10 is illustrated as a racing style road bike, the bicycle shift notification is not limited to use with a road bike. The electric bicycle shifting system includes a bicycle crank axle assembly 12 (i.e., a bicycle component), a rear hub 14 (i.e., a bicycle component) and a cycle computer 16. As explained below, the bicycle crank axle assembly 12 and the rear hub 14 are configured to detect various bicycle operating parameters and provide the detected operating parameters to the cycle computer 16. The electric bicycle shifting system includes a motorized rear derailleur 18, a motorized front derailleur 20, and a pair of shift operating devices or shifters 22A and 22B. A main power supply 24 is provided on a bicycle frame 26 for supplying power to the bicycle crank axle assembly 12, the rear hub 14 with a plurality of sprockets, the cycle computer 16, the rear derailleur 18, the front derailleur 20, and the shifters 22A and 22B.

Figure 3:
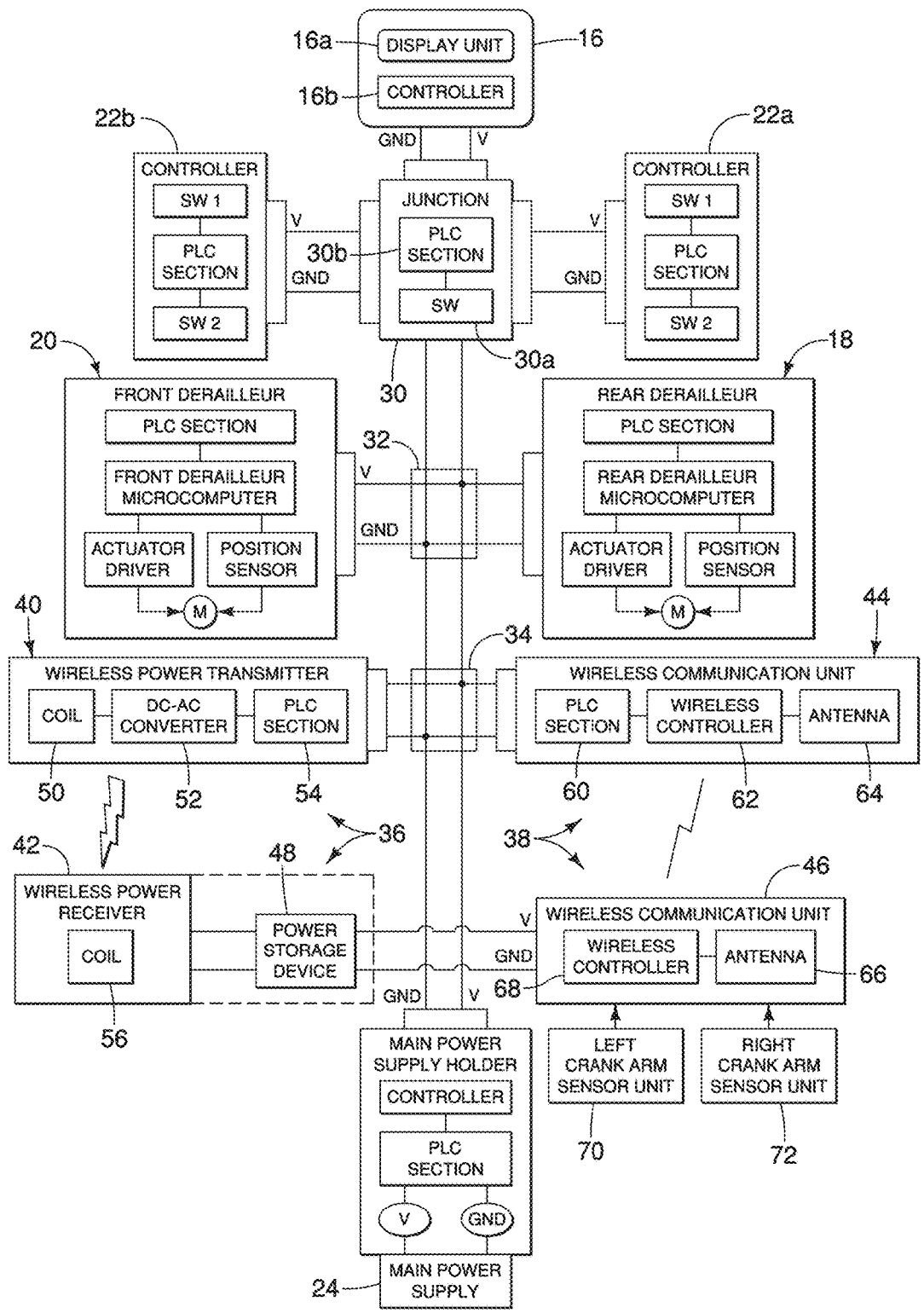
FIG. 3 is a schematic block diagram showing an overall configuration of an electric shifting system of the bicycle illustrated in FIG. 1 with the bicycle crank assembly providing data to the electric shifting system and receiving electrical power from the main power supply.
Figure 8:
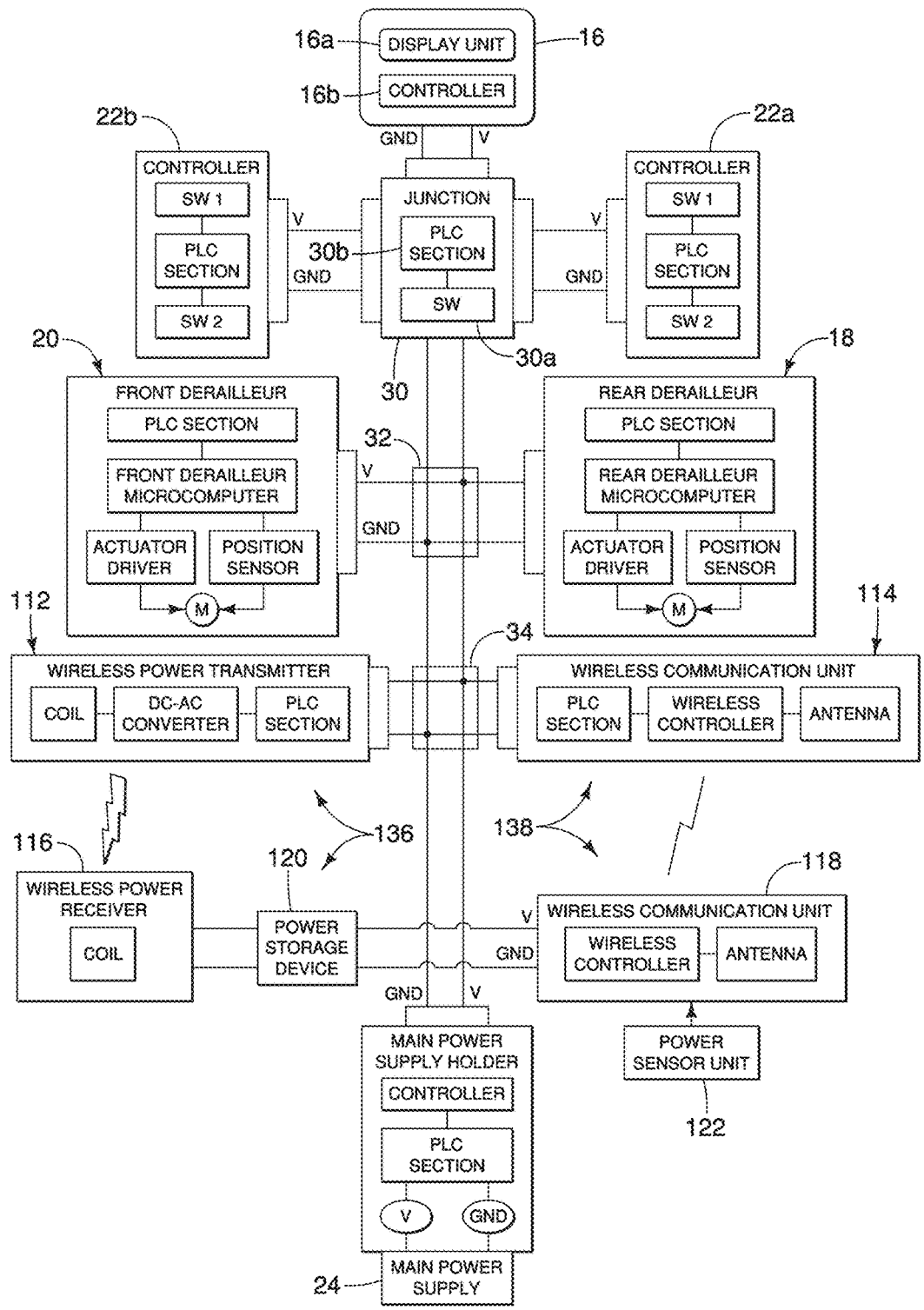
FIG. 8 is a schematic block diagram showing an overall configuration of an electric shifting system of the bicycle illustrated in FIG. 1 with the rear hub providing data to the electric shifting system and receiving electrical power from the main power supply.

As seen in FIG. 3, in the illustrated embodiment, a main wiring junction 30 and a pair of secondary wiring junction 32 and 34 are provided that interconnects the cycle computer 16, the rear derailleur 18, the front derailleur 20, and the shifters 22A and 22B. The main wiring junction 30 has a mode-calibration button for changing a mode of operation and/or for calibrating the derailleurs 18 and 20. Preferably, each of the cycle computer 16, the rear derailleur 18, the front derailleur 20, and the shifters 22A and 22B are each provided with a power line communication (PLC) unit (PLC section) for communicating via power cords having a power line V and a ground line GND. Thus, these bicycle components can communication with each other through electrical power cords and receive electrical power from the main power supply 24. Here, the main power supply 24 is a rechargeable battery, which plugs into a main power supply holder that includes a power controller and a power line communication (PLC) unit (PLC section). On the other hand, the bicycle crank axle assembly 12 wirelessly communicates with the cycle computer 16 and wirelessly receives electric power from the main power supply 24. As shown in FIG. 8, the rear hub 14 also wirelessly communicates with the cycle computer 16 and wirelessly receives power from the main power supply 24.

In the illustrated embodiment, the cycle computer 16 includes a display unit 16a and a controller 16b. The display unit 16a is, for example, an LCD display visually provides information to the rider about the current operating conditions of the bicycle 10. Here, the controller 16b functions as a signal controller for shifting the derailleurs 18 and 20 and for calculating various operating conditions (e.g., rider performance, speed of the bicycle 10, the pedaling power, the crank rotation (cadence) and distance traveled, etc.) that are used for shifting and/or for providing to the rider via the display unit 16a. While the display unit 16a and the controller 16b are integrated together in a single housing in the illustrated embodiment, it will be apparent from this disclosure that the controller 16b can be located separately from the display unit 16a and/or the controller 16b can be formed of several individual controllers as needed and/or desired.

Here, the controller 16b is preferably a micro-computer that includes conventional components such as an input interface circuit, an output interface circuit, and storage devices such as a ROM (Read Only Memory) device and a RAM (Random Access Memory) device. The micro-computer of the controller 16b is programmed to process signals from various sensors and inputs of the bicycle components of the bicycle 10. Here, in the illustrated embodiment, since the controller 16b is used for shifting the derailleurs 18 and 20 either automatically based on the operating condition of the bicycle 10 or in response to operation of the shifters 22A and 22B. The memory circuit of the controller 16b stores, data from the various sensors, processing results and control programs such as ones for carrying out the shifting operations that are run by the processor circuit. For example, the internal RAM of the controller 16b stores statuses of operational flags and various control data, while the internal ROM of the controller 16b stores the programs for various operations.

The derailleurs 18 and 20 are conventional electric derailleurs that are used for changing speed of the drive train. An example of a rear electric derailleur is disclosed in U.S. Patent Application Publication No. 2012/0322591, while an example of a front electric derailleur is disclosed in U.S. Pat. No. 7,306,531. Although the front electric derailleur of U.S. Pat. No. 7,306,531 is not provided with power line communication, it will be apparent that power line communication can be added. The shifters 22A and 229 are electric shifters having electrical switches SW1 and SW2 for performing shifting operations of the derailleurs 18 and 20. An example of such an electric shifter is disclosed in U.S. Pat. No. 7,854,180. Although the electric shifter of U.S. Pat. No. 7,854,180 is not provided with power line communication, it will be apparent that power line communication can be added. Since the derailleurs 18 and 20 and the shifters 22A and 22B are known bicycle components and power line communication is known, the derailleurs 18 and 20 and the shifters 22A and 22B will not be discussed in further detail herein.

Figure 5:
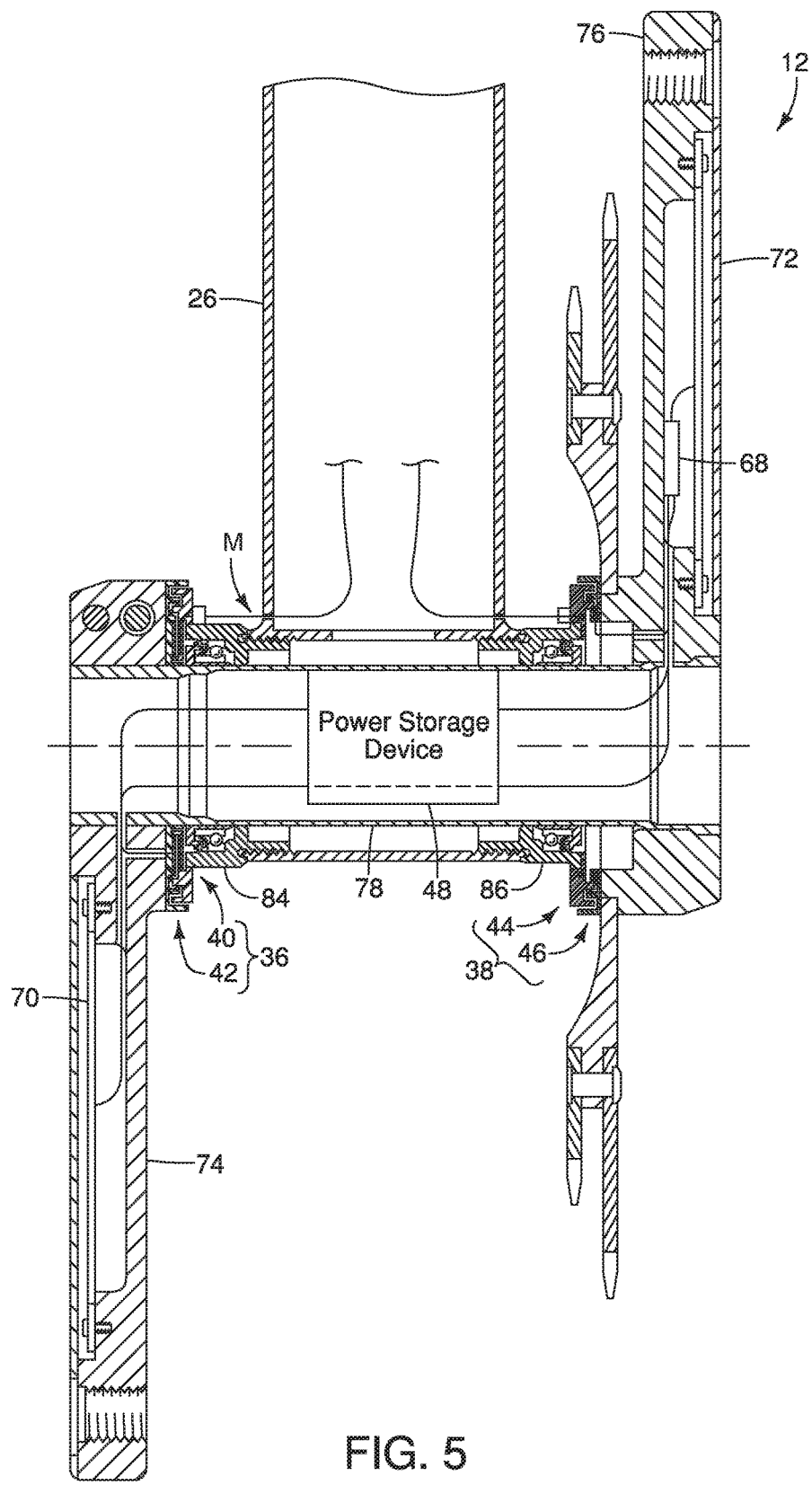
FIG. 5 is a cross-sectional view of the bicycle crank assembly illustrated in FIG. 4 and a portion of the frame of the bicycle.

As seen in FIGS. 3 and 5, a bicycle component (e.g., the bicycle crank axle assembly 12) is basically provided with a wireless electrical power transmission arrangement 36 and a wireless communication arrangement 38. The bicycle component is configured to be mounted to the bicycle frame 26 at a bicycle mounting portion M of the bicycle component. The bicycle component further comprises a remote electrical power supply (e.g., the main power supply 24) that electrically connected to the power transmitter by an external power cable. The wireless electrical power transmission arrangement 36 has a power transmitter 40 and a power receiver 42 to wirelessly transfer electrical power from the power transmitter 40 to the power receiver 42. Wireless power or wireless energy transmission is the transmission of electrical energy from a power source (e.g., the main power supply 24 via the power transmitter 40) to an electrical load (e.g., the wireless communication arrangement 38 via the power receiver 42) without man-made conductors. Preferably, the wireless power transmission is carried out using electromagnetic induction. The wireless communication arrangement 38 has a first communication unit 44 and a second communication unit 46. Preferably, the wireless communication transmission is carried out using radio waves. As explained below, the wireless communication arrangement 38 is spaced from the wireless electrical power transmission arrangement 36 to reduce, and preferably eliminate, the electromagnetic induction field interfering with the radio waves during wireless communication.

Preferably, the power transmitter 40 is electrically connected to a rechargeable power storage device 48 (e.g., a capacitor or battery). While the power storage device 48 is illustrated in FIG. 3 as a separate unit from the power receiver 42, preferably, the power receiver 42 includes a second power coil 56, a capacitor (i.e., the power storage device 48) that is configured to storage electrical power received from the power transmitter 40 as illustrated by the dashed lines in FIG. 3 and AC-DC convertor (not shown) that is connected between the second power coil 56 and the capacitor. In either case, the power storage device 48 is electrically connected to the second communication unit 46 to supply electrical power or energy for the operation of the second communication unit 46. Alternatively, the power storage device 48 can be omitted if desired.

Generally, the power transmitter 40 includes a first power coil 50, a DC-AC converter 52 and a power line communication (PLC) unit 54 (PLC section). Generally, the second power coil 56 of the power receiver 42 is arranged sufficiently close to the first power coil 50 to wirelessly receive electrical power or energy from the first power coil 50. In this way, electrical power or energy is first supplied from the main power supply 24 to the first power coil 50 via the DC-AC converter 52 so that the direct current of the main power supply 24 is converted to alternating current. Then the electrical power or energy of the first power coil 50 is wirelessly transmitted to the second power coil 56. The electrical power or energy is transmitted from the power storage device 48 to the second communication unit 46 for supplying electrical power or energy to the second communication unit 46.

Generally, the first communication unit 44 includes a power line communication (PLC) unit 60 (PLC section), a wireless controller 62 and an antenna coil 64 (also called simply an antenna). Generally, the second communication unit 46 includes an antenna coil 66 (also called simply an antenna) and a wireless controller 68. Thus, each of the first and second communication units 44 and 46 includes an antenna coil for communicating with each other. The controllers 62 and 68 control the transmission of the data (e.g., radio waves) between the first and second communication units 44 and 46. The transmission of the data (e.g., radio waves) can be one-way from the second communication unit 46 to the first communication unit 44, or can be two-way if needed and/or desired. In the case of the bicycle crank axle assembly 12, a left crank arm sensor unit 70 and a right crank arm sensor unit 72 are each electrically connected to the controller 68 of the second communication unit 46 to provide data on a pedaling force being applied to the bicycle crank axle assembly 12. While the crank arm sensor units 70 and 72 are used, it will be apparent that a single power senor unit may be used.

Referring now to FIGS. 4 to 7, the bicycle crank axle assembly 12 (i.e., a bicycle component) having the wireless electrical power transmission arrangement 36 and the wireless communication arrangement 38 will be discussed in more detail.

Figure 4:
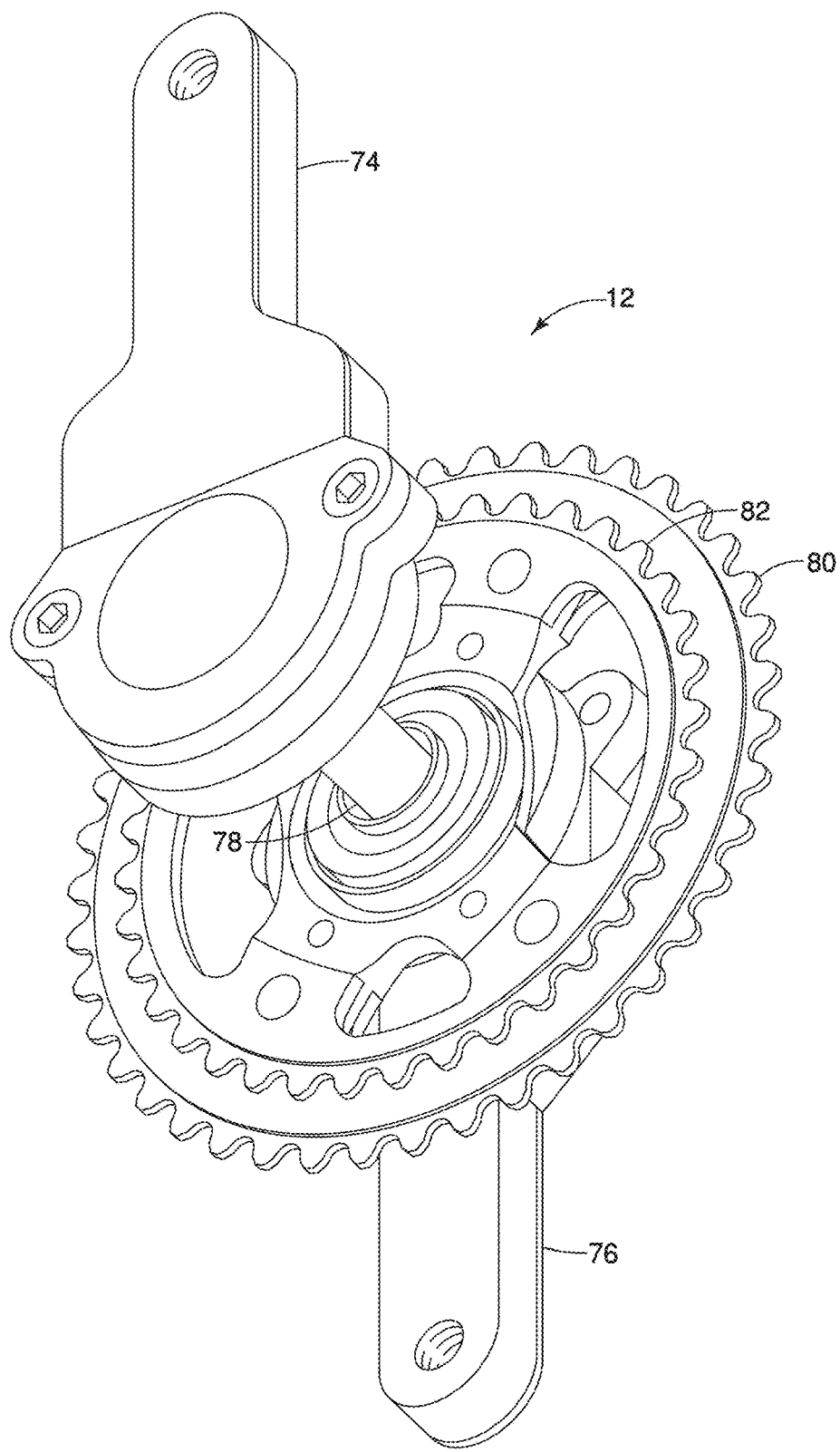
FIG. 4 is a perspective view of a bicycle component in the form of a bicycle crank assembly having a wireless electrical power transmission arrangement and a wireless communication arrangement in accordance with the illustrated embodiment.

Basically, as seen in FIGS. 4 and 5, the bicycle crank axle assembly 12 includes a first (left) crank arm 74, a second (right) crank arm 76 and a crank axle 78. The first and second crank arms 74 and 76 are fixedly coupled to the crank axle 78 such that the first and second crank arms 74 and 76 extend perpendicularly from the crank axle 78 in opposite directions. In the illustrated embodiment, the second crank arm 76 has a pair of sprockets 80 and 82.

The free ends of the first and second crank arm arms 74 and 76 are provided with bicycle pedals (shown in FIG. 1). A rider applies a pedaling force on the bicycle pedals. This pedaling force is then transmitted to the first and second crank arms 74 and 76 for rotating the sprockets 80 and 82 and moving the bicycle chain to propel the bicycle 10 in a conventional manner. The crank axle 78 is rotatably supported in the hanger tube of the bicycle frame 26 by a first bottom bracket part 84 and a second bottom bracket part 86. The first bottom bracket part 84 includes a first bearing unit 88, while the second bottom bracket part 86 includes a second bearing unit 90. The first and second bearing units 88 and 90 are conventional bearings that are used to rotatably support the crank axle 78 in the hanger tube of the bicycle frame 26. The first bottom bracket part 84 and the second bottom bracket part 86 form a bottom bracket of the bicycle crank axle assembly 12.

In the illustrated embodiment, the first and second bottom bracket parts 84 and 86 constitute a stationary structure of the bicycle crank axle assembly 12, and the first and second crank arms 74 and 76 and the crank axle 78 constitute a rotating structure of the bicycle crank axle assembly 12. Thus, broadly speaking, the bicycle component (i.e., the bicycle crank axle assembly 12) further comprises a stationary structure (i.e., the first and second bottom bracket parts 84 and 86), and a rotating structure (i.e., the first and second crank arms 74 and 76 and the crank axle 78) rotatably mounted relative to the stationary structure about a rotational axis. The stationary structure (i.e., the first and second bottom bracket parts 84 and 86) has the power transmitter 40 and the first communication unit 44 disposed thereon. In particular, the stationary structure includes the first bottom bracket part 84 with the power transmitter 40 disposed thereon, and the second bottom bracket part 86 with the first communication unit 44 disposed thereon. The rotating structure includes the crank axle 78, the first crank arm 74 coupled to a first end of the crank axle 78, and second crank arm 76 coupled to a second end of the crank axle 78. The rotating structure (i.e., the first and second crank arms 74 and 76 and the crank axle 78) has the power receiver 42 and the second communication unit 46 disposed thereon. In particular, the rotating structure includes the first crank arm 74 with the power receiver 42 disposed thereon, and the second crank arm 76 with the second communication unit 46 disposed thereon.

At least one of the crank axle 78 and the first and second crank arms 74 and 76 includes at least one strain sensor connected to the second communication unit 46. In the illustrated embodiment, the crank arm sensor unit 70 is provided on the first crank arm 74 and the crank arm sensor unit 72 is provided on the second crank arm 76. The controller 68 and the crank arm sensor units 70 and 72 form a power measurement arrangement disposed on the rotational structure. Here, the controller 68 is mounted on the second crank arm 76. Thus, each of the first and second crank arms 74 and 76 has the power measurement arrangement disposed thereon. The crank arm sensor unit 70 is disposed in a recess of the crank arm 74, while the crank arm sensor unit 72 is disposed in a recess of the crank arm 76. The crank arm sensor unit 70 includes a strain-flexing part 70a that includes a pedaling force sensor 70b (i.e., parameter detection part). Likewise, the crank arm sensor unit 72 includes a strain-flexing part 72a that includes a pedaling force sensor 72b (i.e., parameter detection part). In the illustrated embodiment, each of the pedaling force sensors 70b and 72b includes a plurality of strain sensors (i.e., four strain sensors) that are configured and arranged in the manner as the parameter detection part that is disclosed in U.S. Patent Application Publication No. 2014/0060212. However, the crank arm sensor units 70 and 72 are not limited to this arrangement. Rather, any pedaling force sensing arrangement can be used as needed and/or desired.

As seen in FIG. 5, the first and second communication units 44 and 46 are spaced apart to wirelessly communicate from one of the first and second communication units 44 and 46 to the other of the first and second communication units 44 and 46. The wireless communication arrangement 38 is spaced from the wireless electrical power transmission arrangement 36 by a prescribed distance that is larger than 5.0 mm to reduce, and preferably eliminate, the electromagnetic induction field of the wireless electrical power transmission arrangement 36 interfering with the radio waves of wireless communication arrangement 38 during wireless communication. More preferably, the prescribed distance is larger than 10.0 mm. Even more preferably, the wireless communication arrangement 38 is disposed adjacent a first axial end of the rotating structure (i.e., the first and second crank aims 74 and 76 and the crank axle 78), the wireless electrical power transmission arrangement 36 is disposed adjacent a second axial end of the rotating structure (i.e., the first and second crank arms 74 and 76 and the crank axle 78). The first and second axial ends are opposite ends of the rotating structure (i.e., the first and second crank arms 74 and 76 and the crank axle 78) with respect to the rotational axis.

Preferably, the stationary structure includes a first (power) coil holder 40a that is fixedly coupled to the first bottom bracket part 84 with the power transmitter 40 disposed on the first coil holder 40a. The first coil holder 40a can be detachably fixed on the first bottom bracket part 84 by a fixed member, e.g. a screw or a bolt. Preferably, the stationary structure includes a second (antenna) coil holder 44a that is fixedly coupled to the second bottom bracket part 86 with the first communication unit 44 disposed on the second coil holder 44a. The second coil holder 44a can be detachably fixed on the second bottom bracket part 86 by a fixed member, e.g. a screw or a bolt. The first and second coil holders 40a and 44a are formed of a non-magnetism material such as a hard plastic material.

Preferably, the rotating structure includes a third (power) coil holder 42a that is fixedly coupled to the first crank arm 74 with the power receiver 42 disposed on the third coil holder 42a. Preferably, the rotating structure includes a fourth (antenna) coil holder 46a that is fixedly coupled to the second crank arm 76 with the second communication unit 46 disposed on the fourth coil holder 46a. The third and fourth coil holders 42a and 46a are formed of a non-magnetism material such as a hard plastic material.

The power coils 50 and 56 are partially embedded in the first and third coil holders 40a and 42a. The first and third coil holders 40a and 42a are axially spaced apart from each other by one or two millimeters so that they do not contact each other when the first crank arm 74 rotates relative to the first bottom bracket part 84. Each of the power coils 50 and 56 can be covered by non-magnetism material.

The antenna coils 64 and 66 are completely embedded in the second and fourth coil holders 44a and 46a. Thus, each of the antenna coils 64 and 66 are covered by a non-magnetism material. The second and fourth coil holders 42a and 46a are spaced apart from each other by one or two millimeters so that they do not contact each other when the second crank arm 76 rotates relative to the second bottom bracket part 86. The antenna coils 64 and 66 can be disposed on the surfaces of the second and fourth coil holders 44a and 46a, and covered by non-magnetism material.

Figure 6:
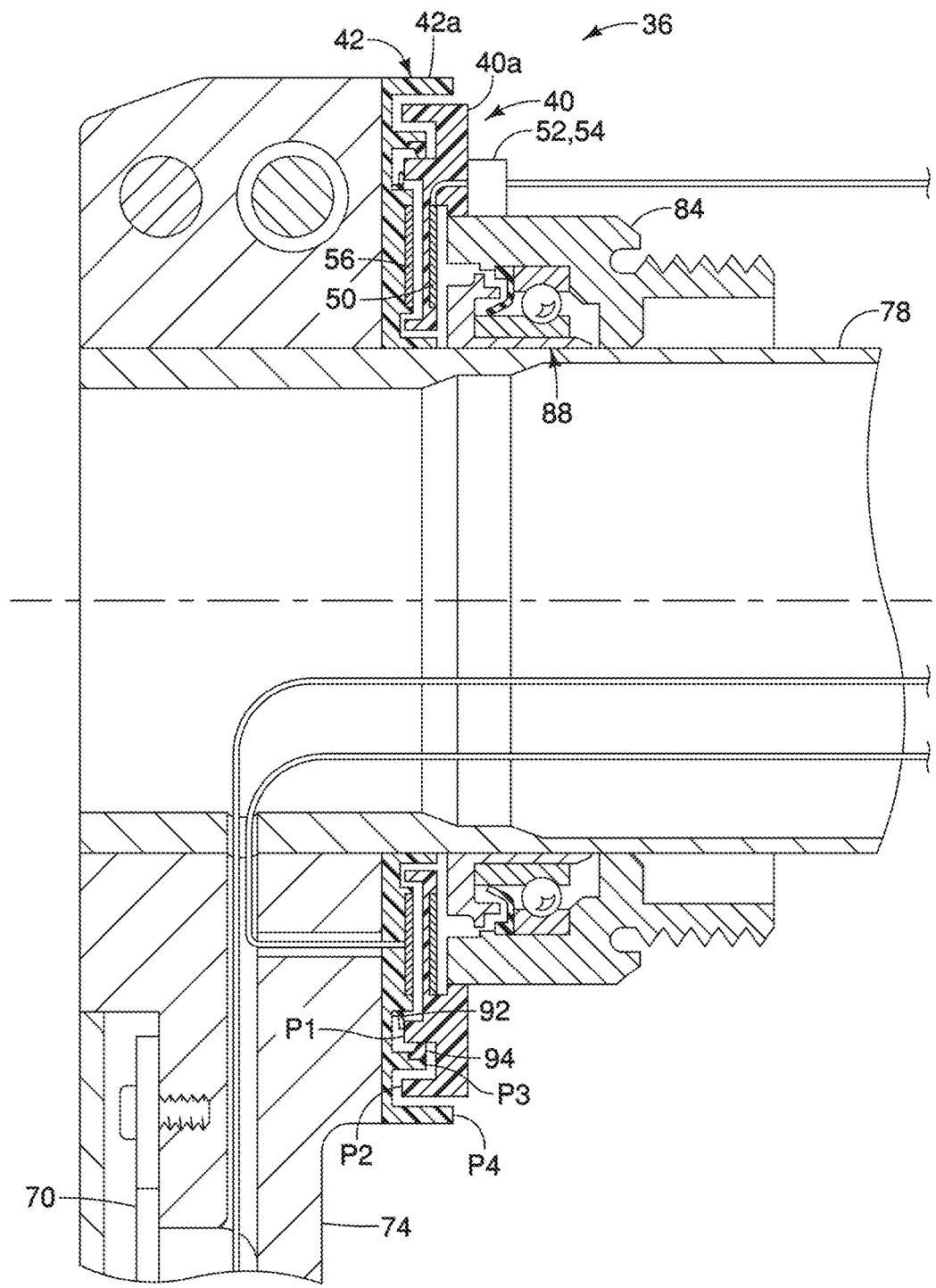
FIG. 6 is an enlarged cross-sectional view of a portion of a left end of the bicycle crank assembly illustrated in FIGS. 4 and 5.

Preferably, a first seal structure including two rubber seals 92 and 94 are disposed in an axial space between the first coil holder 40a of the stationary structure and the third coil holders 42a of the rotating structure at a location radially outward of the power coils 50 and 56 of the wireless electrical power transmission arrangement 36. The seals 92 and 94 prevent water or dust from reaching the power coils 50 and 56. The rubber seals 92 and 94 have an overall circular or annular configuration with a uniform cross section as seen in FIG. 6.

The first coil holder 40a has first and second circular or annular protrusions P1 and P2 protruding towards the first crank arm 74 in an axial direction with respect to the crank axle 78. The first circular protrusion P1 is disposed in radially inward from the second circular protrusion P2. The first and second circular or annular protrusions P1 and P2 are concentrically arranged about the crank axle 78. The third coil holder 42a has third and fourth circular or annular protrusions P3 and P4 protruding towards the first bottom bracket part 84 in axial direction with respect to the crank axle 78. The third circular protrusion P3 is disposed in radially inward from the fourth circular protrusion P4. The first, second, third and fourth protrusions P1, P2, P3 and P4 overlap as viewed in the radial direction with respect to the crank axle 78. The third protrusion P3 is disposed between the first and second protrusions P1 and P2. The second protrusion P2 is disposed between the third and fourth protrusions P3 and P4.

The rubber seal 92 has a base portion that is fixed on one of the first coil holder 40a and the third coil holder 42a, and a distal end that is elastically contacting the other of the first coil holder 40a and the third coil holder 42a. The rubber seal 94 has a base portion that is fixed on one of the first coil holder 40a and the third coil holder 42a, and a distal end that is elastically contacting the other of the first coil holder 40a and the third coil holder 42a. Preferably, at least one of the rubber seals 92 and 94 is fixed on one of the first, second, third and fourth protrusions P1, P2, P3 and P4 and extends in the radial direction with respect to the crank axle 78. Preferably, the rubber seals 92 and 94 are disposed radially inside of the third protrusion P3 with respect to the radial direction of the crank axle 78. In the illustrated embodiment, the base portion of the rubber seal 92 is fixed on the third coil holder 42a and the distal end of the rubber seal 92 elastically contacts the first circular protrusion P1 of the first coil holder 40a. Also in the illustrated embodiment, the base portion of the rubber seal 94 is fixed on the third circular protrusion P3 of the third coil holder 42a and the distal end of the rubber seal 92 elastically contacts the first circular protrusion P1 of the first coil holder 40a.

Figure 7:
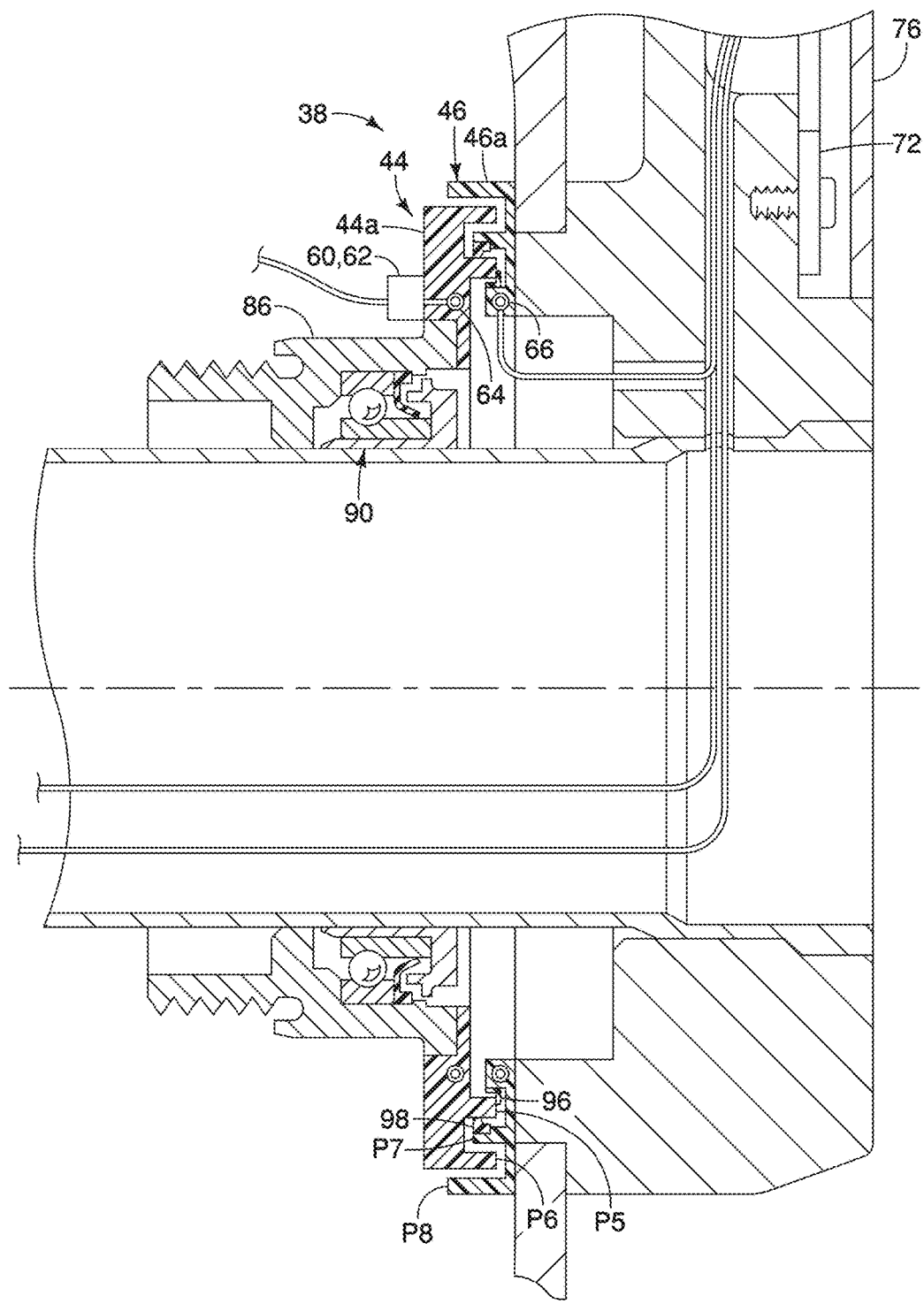
FIG. 7 is an enlarged cross-sectional view of a portion of a right end of the bicycle crank assembly illustrated in FIGS. 4 and 5.

Preferably, a second seal structure including two rubber seals 96 and 98 are disposed in an axial space between the second coil holder 44a of the stationary structure and the fourth coil holder 46a of the rotating structure at a location radially outward of the antenna coils 64 and 66 of the wireless communication arrangement 38. The seals 96 and 98 prevent water or dust from reaching the antenna coils 64 and 66. The rubber seals 96 and 98 have an overall circular or annular configuration with a uniform cross section as seen in FIG. 7.

The second coil holder 44a has fifth and sixth circular or annular protrusions P5 and P6 protruding towards the crank arm 74 in an axial direction with respect to the crank axle 78. The fifth circular protrusion P5 is disposed in radially inward from the sixth circular protrusion P6. The fifth and sixth circular or annular protrusions P5 and P6 are concentrically arranged about the crank axle 78. The fourth coil holders 46a has seventh and eighth circular or annular protrusions P7 and P8 protruding towards the second bottom bracket part 86 in axial direction with respect to the crank axle 78. The seventh circular protrusion P7 is disposed in radially inward from the eighth circular protrusion P8. The fifth, sixth, seventh and eighth protrusions P5, P6, P7 and P8 overlap as viewed in the radial direction with respect to the crank axle 78. The seventh protrusion P7 is disposed between the fifth and sixth protrusions P5 and P6. The sixth protrusion P6 is disposed between the seventh and eighth protrusions P7 and P8.

The rubber seal 96 has a base portion that is fixed on one of the second coil holder 44a and the fourth coil holder 46a, and a distal end that is elastically contacting the other of the second coil holder 44a and the fourth coil holder 46a. The rubber seal 98 has a base portion that is fixed on one of the second coil holder 44a and the fourth coil holder 46a, and a distal end that is elastically contacting the other of the second coil holder 44a and the fourth coil holder 46a. Preferably, at least one of the rubber seals 96 and 98 is fixed on one of the fifth, sixth, seventh and eighth protrusions P5, P6, P7 and P8 and extends in the radial direction with respect to the crank axle 78. Preferably, the rubber seals 96 and 98 are disposed radially inside of the seventh protrusion P7 with respect to the radial direction of the crank axle 78. In the illustrated embodiment, the base portion of the rubber seal 96 is fixed on the fourth coil holder 46a and the distal end of the rubber seal 96 elastically contacts the fifth circular protrusion P5 of the second coil holder 44a. Also in the illustrated embodiment, the base portion of the rubber seal 98 is fixed on the seventh circular protrusion P7 of the fourth coil holder 46a and the distal end of the rubber seal 98 elastically contacts the fifth circular protrusion P5 of the second coil holder 44a.

Figure 9:
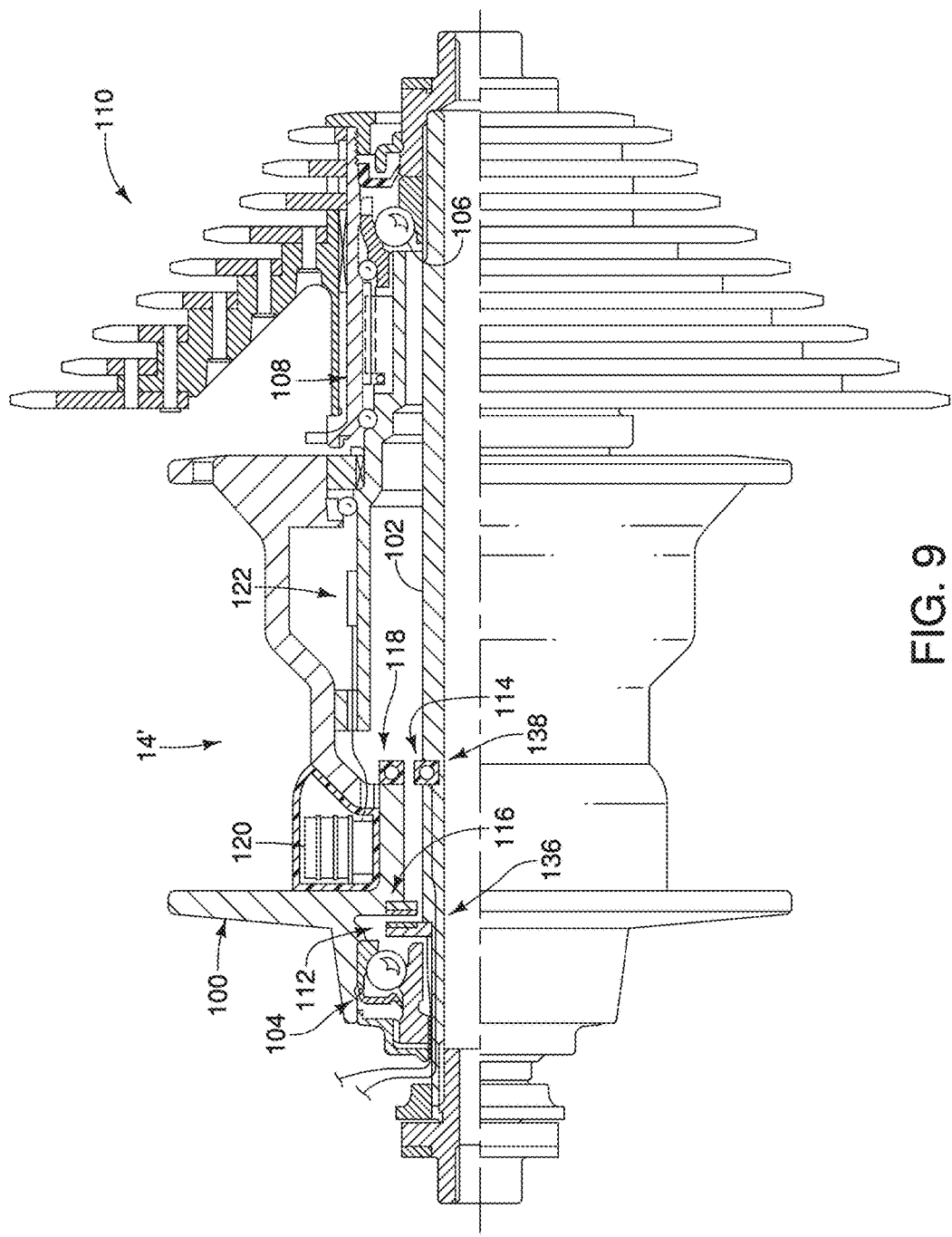
FIG. 9 is a cross-sectional view of a bicycle component in the form of the rear hub having the wireless electrical power transmission arrangement and the wireless communication arrangement in accordance with the illustrated embodiment.

Referring now to FIGS. 8 and 9, a rear hub 14' (i.e., a bicycle component) that replaces the conventional rear hub 14 of FIG. 1 will now be discussed. Here, when the rear hub 14' is installed in the bicycle 10, the crank axle assembly 12 would be replaced with a conventional crank axle assembly. As explained below, the rear hub 14' is equipped with a bicycle power sensing apparatus.

The rear hub 14' rotatably supports a rear wheel on the frame 26 in a conventional manner. In the illustrated embodiment, the rear hub 14' basically includes a hub shell 100 and a hub axle 102. In the rear hub 14', the stationary structure includes the hub axle 102 and the rotating structure includes the hub shell 100. The hub shell 100 is rotatably supported on the hub axle 102 by a pair of bearing units 104 and 106. The rear hub 14' also has a freewheel 108 for attaching a rear gear cassette 110. The hub axle 102 has a center longitudinal axis that defines a center rotational axis of the hub shell 100. The hub shell 100 constitutes a driven member that receives a driving torque or force from a chain via the rear gear cassette 110 that are mounted on the freewheel 108.

Here in the rear hub 14', the hub axle 102 (the stationary structure) includes a power transmitter 112 and a first communication unit 114, while the hub shell 100 includes a power receiver 116 and a second communication unit 118. The power transmitter 112 and the first communication unit 114 are electrical coupled by power cords to the wiring junction 34 so as to receive electrical power or energy from the main power supply 24. The power transmitter 112 wirelessly transfers electrical power to the power receiver 116. The first communication unit 114 and the second communication unit 118 send and receive data.

The hub shell 100 also includes a controller 120 and a power sensing unit 122. As seen in FIG. 7, the power transmitter 112 has the same construction as the power transmitter 40, except that the power transmitter 112 is configured to be fixed to the hub axle 102. The first communication unit 114 has the same construction as the first communication unit 44. The power receiver 116 has the same construction as the power receiver 42, except that the power receiver 116 is configured to be fixed to the hub axle 102. The second communication unit 118 has the same construction as the second communication unit 46 except that the second communication unit 118 is configured to be fixed to the hub axle 102. Thus, the power transmitter 112 and the power receiver 116 form a wireless electrical power transmission arrangement 136, while the first and second communication unit 114 and 118 form a wireless communication arrangement 138. The wireless electrical power transmission arrangement 136 wirelessly transfers electrical power from the power transmitter 112 to the power receiver 116.

Here, the wireless electrical power transmission arrangement 136 and the wireless communication arrangement 138 are the same as the wireless electrical power transmission arrangement 36 and the wireless communication arrangement 38, as discussed above, except that the wireless electrical power transmission arrangement 136 and the wireless communication arrangement 138 are adapted to the rear hub 14'. In view of the similarities of the wireless electrical power transmission arrangement 136 and the wireless communication arrangement 138 to the wireless electrical power transmission arrangement 36 and the wireless communication arrangement 38, the wireless electrical power transmission arrangement 136 and the wireless communication arrangement 138 will only be briefly described herein.

The power sensing unit 122 is able to measure the driving force of a rider, which is processed by the controller 120. The controller 120 transmits information related to the driving force measured by the power sensing unit 122 to the rider via the wireless communication arrangement 138. The information related to the driving force which is transmitted is displayed on, for example, the cycle computer 16, which is mounted on the handlebar of the bicycle 10. Here, in the cycling computer 16, information such as the speed of the bicycle, the rotation speed of a crank (cadence), the distance traveled, and the like can also be displayed to the rider. U.S. Patent Application Publication No. 2014/0074348 describes an example of a power sensing unit that can be adapted to construct the power sensing unit 122 shown in FIG. 9.

While the wireless electrical power transmission arrangement and the wireless communication arrangement were only illustrated in a crank axle assembly and a rear hub, it will be apparent from this disclosure that the wireless electrical power transmission arrangement and the wireless communication arrangement can be adapted to other bicycle components having the need of electrical power to be provided to a moving part that also need to transmit data from the moving part.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle component. Accordingly, these terms, as utilized to describe the bicycle component should be interpreted relative to a bicycle equipped with the bicycle component as used in the normal riding position on a horizontal surface.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as the changes do not substantially affect their intended function. Components that are shown directly connected or contacting each other can have intermediate structures disposed between them so long as the changes do not substantially affect their intended function. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle component comprising:
a wireless electrical power transmission arrangement having a power transmitter and a power receiver to wirelessly transfer electrical power from the power transmitter to the power receiver;
a wireless communication arrangement having a first communication unit and a second communication unit, the first and second communication units being spaced apart to wirelessly communicate from one of the first and second communication units to the other of the first and second communication units, the wireless communication arrangement being spaced from the wireless electrical power transmission arrangement by a prescribed distance that is larger than 5.0 mm;
a stationary structure having the power transmitter and the first communication unit disposed thereon, the stationary structure being configured to be fixedly disposed on a bicycle frame; and
a rotating structure rotatably mounted relative to the stationary structure about a rotational axis, the rotating structure having the power receiver and the second communication unit disposed thereon.

2. The bicycle component according to claim 1, wherein the wireless communication arrangement is disposed adjacent a first axial end of the rotating structure, the wireless electrical power transmission arrangement is disposed adjacent a second axial end of the rotating structure, and the first and second axial ends are opposite ends of the rotating structure with respect to the rotational axis.

3. The bicycle component according to claim 1, wherein the stationary structure includes a first bottom bracket part with the power transmitter disposed thereon and a second bottom bracket part with the first communication unit disposed thereon.

4. The bicycle component according to claim 3, wherein the stationary structure includes a first coil holder that is coupled to the first bottom bracket part with the power transmitter disposed on the first coil holder, and a second coil holder that is coupled to the second bottom bracket part with the first communication unit disposed on the second coil holder.

5. The bicycle component according to claim 4, wherein the first and second coil holders are formed of a non-magnetism material.

6. A bicycle component comprising:
a wireless electrical power transmission arrangement having a power transmitter and a power receiver to wirelessly transfer electrical power from the power transmitter to the power receiver;
a wireless communication arrangement having a first communication unit and a second communication unit, the first and second communication units being spaced apart to wirelessly communicate from one of the first and second communication units to the other of the first and second communication units, the wireless communication arrangement being spaced from the wireless electrical power transmission arrangement by a prescribed distance that is larger than 5.0 mm;
a stationary structure having the power transmitter and the first communication unit disposed thereon; and
a rotating structure rotatably mounted relative to the stationary structure about a rotational axis, the rotating structure having the power receiver and the second communication unit disposed thereon, the rotating structure including a crank axle, a first crank arm coupled to a first end of the crank axle, and a second crank arm coupled to a second end of the crank axle.

7. The bicycle component according to claim 6, wherein at least one of the crank axle and the first and second crank arms includes at least one strain sensor connected to the second communication unit.

8. The bicycle component according to claim 1, further comprising
a power measurement arrangement disposed on the rotational structure.

9. The bicycle component according to claim 8, further comprising
a crank arm having the power measurement arrangement disposed thereon.

10. The bicycle component according to claim 1, wherein the stationary structure includes a hub axle, and the rotating structure includes a hub shell.

11. The bicycle component according to claim 1, further comprising
a first seal structure disposed in an axial space between the stationary structure and the rotating structure at a location radially outward of the wireless electrical power transmission arrangement, and
a second seal structure disposed in an axial space between the stationary structure and the rotating structure at a location radially outward of the wireless communication arrangement.

12. The bicycle component according to claim 1, wherein each of the first and second communication units includes an antenna coil.

13. The bicycle component according to claim 12, wherein
each of the antenna coils are covered by a non-magnetism material.

14. The bicycle component according to claim 1, wherein the power transmitter includes a DC-AC converter.

15. The bicycle component according to claim 1, wherein the power transmitter includes a power line communication unit.

16. The bicycle component according to claim 1, further comprising
a remote electrical power supply electrically connected to the power transmitter by an external power cable.

17. The bicycle component according to claim 1, wherein the power receiver includes a capacitor configured to storage electrical power received from the power transmitter.

18. The bicycle component according to claim 1, wherein the prescribed distance is larger than 10.0 mm.

* * * * *